(12) United States Patent
Ishikawa et al.

(10) Patent No.: US 8,202,182 B2
(45) Date of Patent: Jun. 19, 2012

(54) MOTION RESISTING APPARATUS FOR A BICYCLE DERAILLEUR

(75) Inventors: Noriyasu Ishikawa, Sakai (JP); Takeshi Takachi, Kawachinagano (JP)

(73) Assignee: Shimano, Inc., Sakai-ku (JP)

( * ) Notice: Subject to any disclaimer, the term of this patent is extended or adjusted under 35 U.S.C. 154(b) by 691 days.

(21) Appl. No.: 12/126,958

(22) Filed: May 26, 2008

(65) Prior Publication Data
US 2009/0291789 A1    Nov. 26, 2009

(51) Int. Cl.
*F16H 9/00*    (2006.01)
(52) U.S. Cl. ......... 474/82; 474/80; 74/473.12; 192/226
(58) Field of Classification Search ............... 474/82, 474/117, 80, 69, 70, 177; 74/473.12, 473.13; 192/217, 226
See application file for complete search history.

(56) References Cited

U.S. PATENT DOCUMENTS

| | | | |
|---|---|---|---|
| 4,406,643 A | 9/1983 | Shimano | |
| 4,552,546 A | 11/1985 | Ishikawa | |
| 4,692,131 A | 9/1987 | Nagano | |
| 5,860,880 A * | 1/1999 | Oka | ............... 474/77 |
| 6,216,078 B1 | 4/2001 | Jinbo et al. | |
| 6,450,060 B1 | 9/2002 | Shahana | |
| 6,698,567 B2 | 3/2004 | Dal Pra' | |
| 6,726,586 B2 * | 4/2004 | Fukuda | ........... 474/70 |
| 6,741,045 B2 | 5/2004 | Kitamura | |
| 6,997,835 B2 * | 2/2006 | Fukuda | ........... 474/82 |
| 2007/0219029 A1 | 9/2007 | Turner | |
| 2009/0054183 A1 | 2/2009 | Takachi et al. | |

FOREIGN PATENT DOCUMENTS

EP    850829 A2    7/1998

OTHER PUBLICATIONS

European Search Report for EP 09150985.1, The European application that corresponds to this application, dated Oct. 5, 2009.

* cited by examiner

*Primary Examiner* — Emmanuel M Marcelo
(74) *Attorney, Agent, or Firm* — James A. Deland

(57) ABSTRACT

A bicycle derailleur apparatus comprises a base member for coupling to a bicycle frame, a movable member coupled for movement relative to the base member, a chain guide coupled to the movable member for guiding a chain among a plurality of sprockets in response to movement of the movable member, and a biasing device that provides a biasing force to the chain guide for tensioning the chain. A movement resisting device has a control element for the application of a signal that causes the movement resisting device to change resistance to movement of the chain guide.

22 Claims, 5 Drawing Sheets

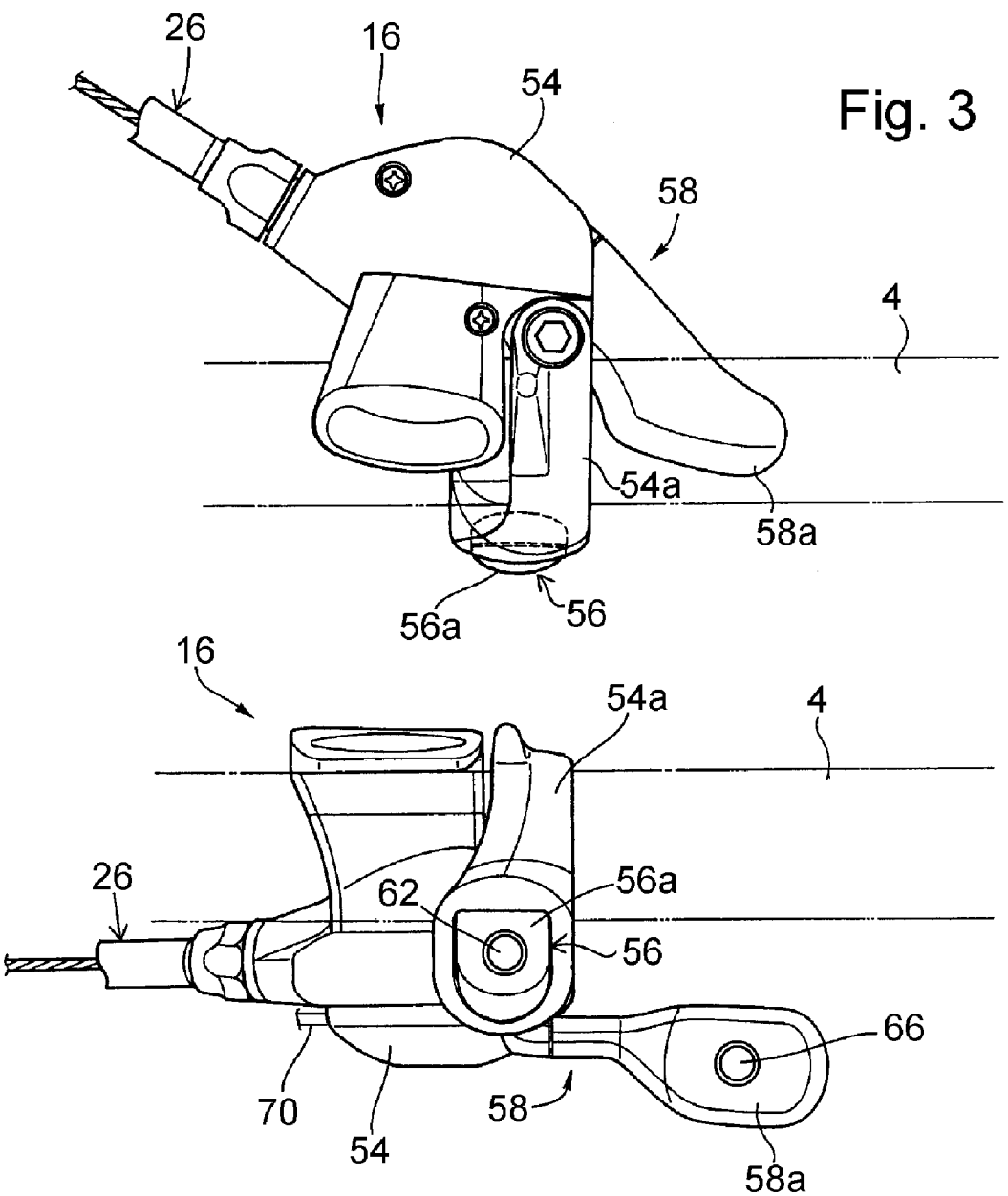

MOTION RESISTING APPARATUS FOR A BICYCLE DERAILLEUR

BACKGROUND OF THE INVENTION

The present invention is directed to bicycle derailleurs and, more particularly, to a motion resisting apparatus for a bicycle derailleur.

A typical bicycle derailleur comprises a base member for coupling to a bicycle frame, a movable member coupled for movement relative to the base member, and a chain guide coupled to the movable member for guiding a chain among a plurality of sprockets. In a rear derailleur, the chain guide supports an upper guide pulley and a lower tension pulley, and the chain guide is pivotably mounted to the movable member through a pivot shaft. A spring is mounted between the movable member and the chain guide for biasing the chain guide in a clockwise direction.

When the rear derailleur is mounted to the bicycle, the guide pulley is located below a plurality of rear sprockets that are mounted to the rear wheel. The bicycle chain coupled to the front sprocket assembly engages the top and rear of one of the plurality of rear sprockets, engages the front of the guide pulley, engages the rear of the tension pulley, and then returns to the front sprocket assembly. During riding, the chain moves from the currently engaged front sprocket, to the tension pulley, to the guide pulley, and then to the selected rear sprocket. Because the chain length is set so that the chain can engage the largest front sprocket and the largest rear sprocket, the chain experiences slack whenever the chain engages a smaller front sprocket and/or a smaller rear sprocket. When that occurs, the spring bias rotates the chain guide so that the tension pulley takes up the slack on the chain and prevents the chain from falling off of the sprockets.

Mountain bicycles, for example, typically are ridden over rough terrain at high speed. As a result, the bicycle often experiences severe vibrations. Such vibrations can cause the chain guide to rotate counterclockwise, thereby restoring the slack in the chain and causing the chain to malfunction. To prevent such malfunctions, some rear derailleurs include one-way friction clutches that resist clockwise movement of the chain guide, and some rear derailleurs include hydraulic shock absorbers that resist sudden movement of the chain guide.

SUMMARY OF THE INVENTION

The present invention is directed to various features of a bicycle shift control device. In one embodiment, a bicycle derailleur apparatus comprises a base member for coupling to a bicycle frame, a movable member coupled for movement relative to the base member, a chain guide coupled to the movable member for guiding a chain among a plurality of sprockets in response to movement of the movable member, and a biasing device that provides a biasing force to the chain guide for tensioning the chain. A movement resisting device has a control element for the application of a signal that causes the movement resisting device to change resistance to movement of the chain guide. Additional inventive features will become apparent from the description below, and such features alone or in combination with the above features and their equivalents may form the basis of further inventions as recited in the claims.

BRIEF DESCRIPTION OF THE DRAWINGS

FIG. 3 is a top view of a particular embodiment of a shift control device attached to a handlebar;

FIG. 4 is a front view of the shift control device;

DETAILED DESCRIPTION OF THE EMBODIMENTS

Figure 1:
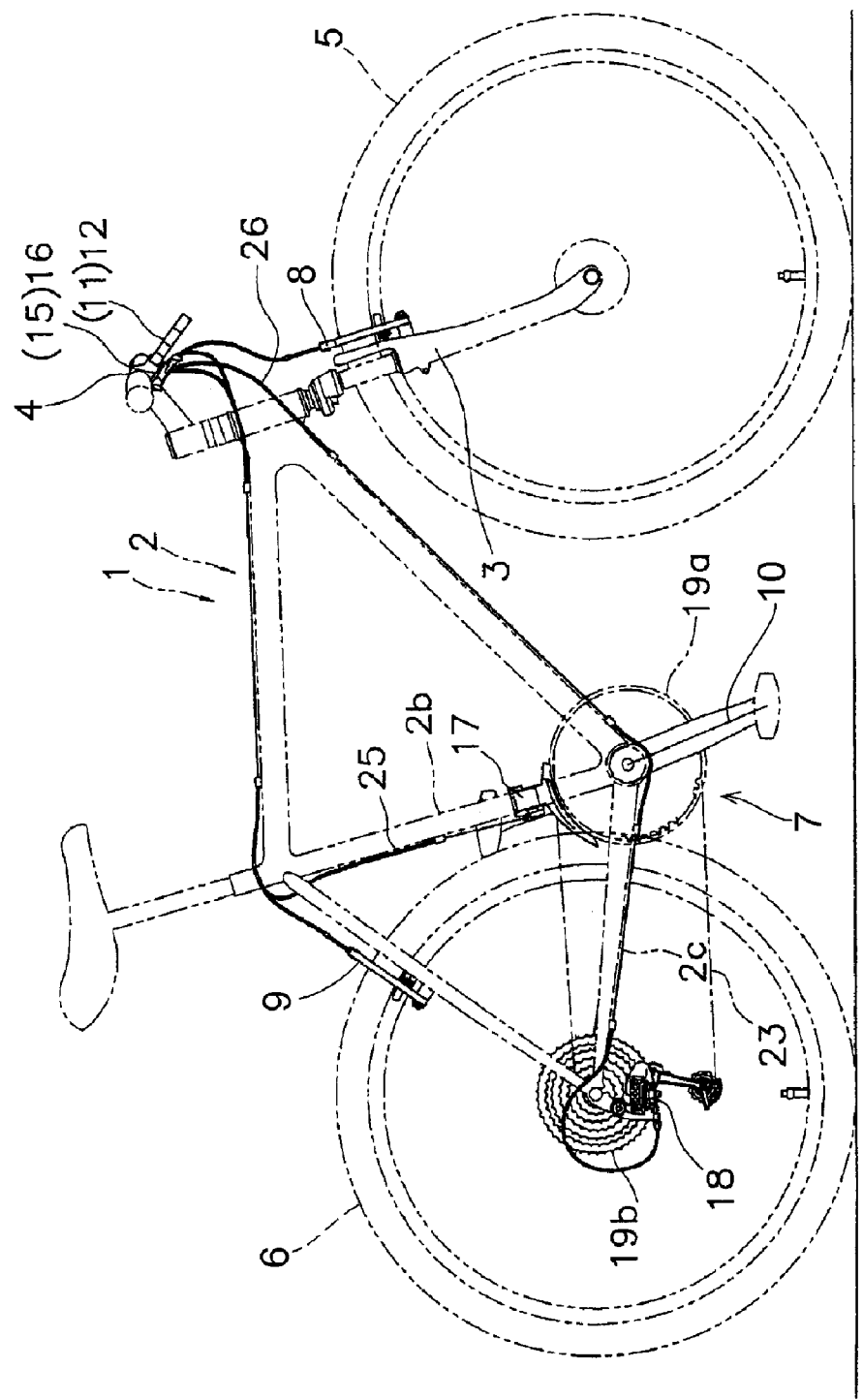
FIG. 1 is a side view of a particular embodiment of a bicycle.

FIG. 1 is a side view of a particular embodiment of a bicycle 1. Bicycle 1 is a mountain bicycle comprising a diamond-shaped frame 2, a front fork 3 rotatably mounted to frame 2, a handlebar 4 mounted to the upper part of fork 3, a front wheel 5 rotatably attached to the lower part of fork 3, a rear wheel 6 rotatably attached to the rear of frame 2, and a drive unit 7. A front wheel brake 8 is provided for braking front wheel 5, and a rear wheel brake 9 is provided for braking rear wheel 6.

Drive unit 7 comprises a chain 23, a front sprocket assembly 19a (comprising a plurality of front sprockets) coaxially mounted with a pedal crank unit 10 having pedals, a front derailleur 17 attached to a seat tube 2b of frame 2, a rear sprocket assembly 19b (comprising a plurality of rear sprockets) coaxially mounted with rear wheel 6, and a rear derailleur 18 mounted to the rear end of a chain stay 2c of frame 2. In this embodiment, front sprocket assembly 19a comprises three sprockets mounted coaxially with crank unit 10, and rear sprocket assembly 19b comprises nine sprockets mounted coaxially with rear wheel 106r. Front derailleur 17 moves to three operating positions to switch chain 23 among selected ones of the three front sprockets, and rear derailleur 18 moves to nine operating positions to switch chain 23 among selected ones of the nine rear sprockets.

Front derailleur 17 and rear derailleur 18 are connected to respective front and rear shift control devices 15 and 16 through front and rear shift cables 25 and 26. Front and rear shift control devices 15 and 16 are mounted to the inside of and in proximity to brake levers 11 and 12 mounted on handlebar 4. The front and rear shift control devices 15 and 16 have a symmetrical construction, and the configuration and operation of each is substantially the same except for the number of shift stages.

Figure 2:
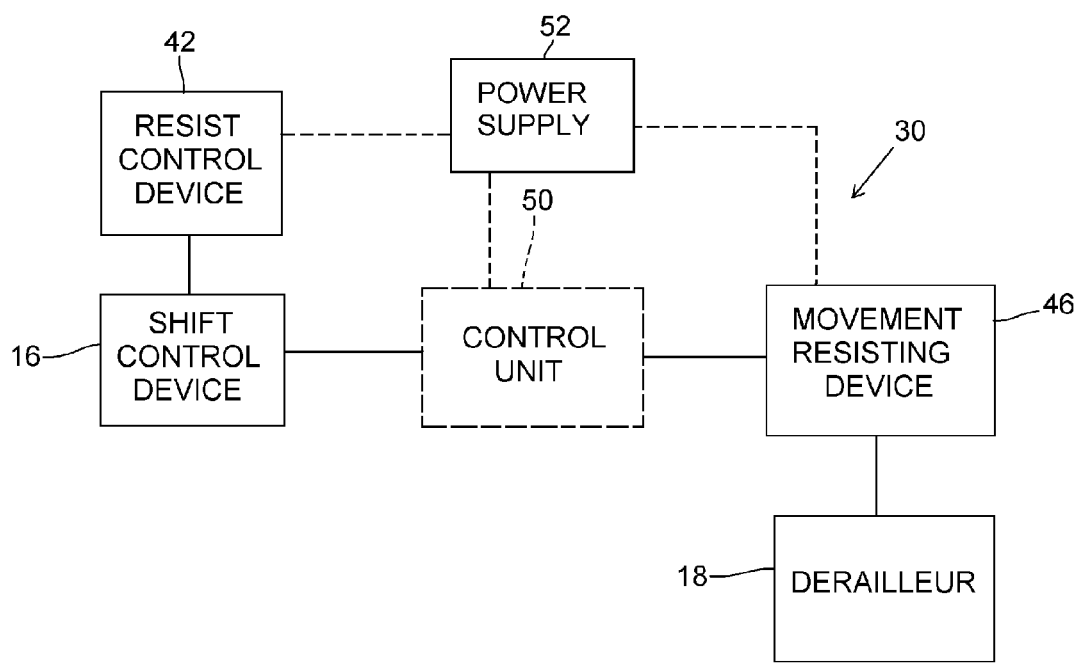
FIG. 2 is a conceptual block diagram of a particular embodiment of a bicycle derailleur apparatus that includes an electrically operated movement resisting device.

FIG. 2 is a conceptual block diagram of a particular embodiment of a bicycle derailleur apparatus 30 that could be applied to bicycle 1. Bicycle derailleur apparatus 30 includes rear shift control device 16, rear derailleur 18; a resist control device 42 operatively coupled to rear shift control device 16; and a movement resisting device 46 operatively coupled to rear derailleur 18. In this embodiment, front derailleur 17 and rear derailleur 18 are mechanically operated, but the teachings herein also could be applied to an electrically operated bicycle disclosed, for example, in U.S. Pat. No. 6,741,045, the entire disclosure of which is incorporated herein by reference. Accordingly, an optional control unit 50 constructed according to the teachings of U.S. Pat. No. 6,741,045, for example, is shown to illustrate the application of the teachings herein to such a bicycle. Depending upon the application, a power supply 52 may be operatively coupled to resist control device 42, to movement resisting device 46, and/or to control unit 50, if provided. Power supply 52 may be a battery, power provided from a generator, solar power, or any suitable power source.

FIG. 3 is a top view of a particular embodiment of rear shift control device 16 attached to handlebar 4, and FIG. 4 is a front view of rear shift control device 16. Shift control device 16 is constructed for pulling and releasing a Bowden-type shift control cable 26, and it includes a mounting bracket 54 with an annular mounting sleeve 54a that fits around handlebar 4 to fasten bracket 54 to handlebar 4 in a known manner. A first operating element in the form of an upshift push button 56 with a finger contact surface 56a is disposed in mounting bracket 54 below handlebar 4 as shown in FIG. 4, and a second operating element in the form of a downshift lever 58 with a finger contact surface 58a also extends below handlebar 4. As a result, the operation of both operating elements is possible with the thumb of the hand gripping handlebar 4. Rear shift control device 16 may be constructed according to the teachings of U.S. Pat. No. 6,450,060, the entire disclosure of which is incorporated herein by reference, modified by the teachings herein.

An upshift resist control device in the form of an upshift resist control push button switch 62 is coupled to upshift push button 56, and a downshift resist control device in the form of a downshift resist control push button switch 66 is coupled to downshift lever 58. More specifically, in this embodiment, upshift resist control push button switch 62 (which may be a normally-closed contact switch) is mounted to finger contact surface 56a of upshift push button 56, and downshift resist control push button switch 66 (which may be a normally-closed contact switch) is mounted to finger contact surface 58a of downshift lever 58. Signals from upshift resist control push button switch 62 and downshift resist control push button switch 66 are communicated on a communication path 70. Of course, signals from upshift resist control push button switch 62 and downshift resist control push button switch 66 could be communicated wirelessly in some embodiments. Power from optional power supply 52 (which may be mounted anywhere on the bicycle) also could be communicated on communication path 70. However, for reasons discussed below, a power supply is not needed in this embodiment.

Figure 5:
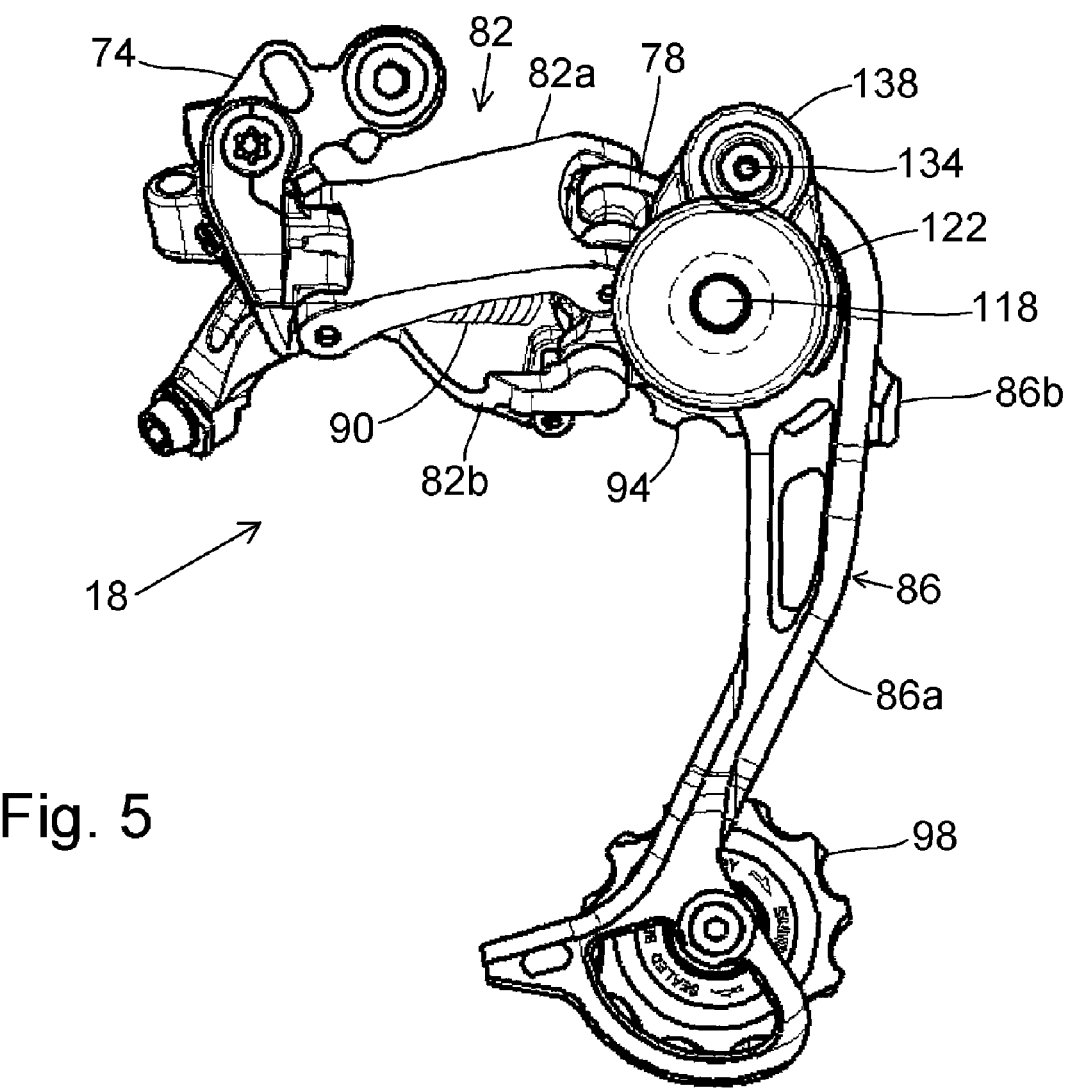
FIG. 5 is a side view of a particular embodiment of a rear derailleur that includes a movement resisting device.
Figure 6:
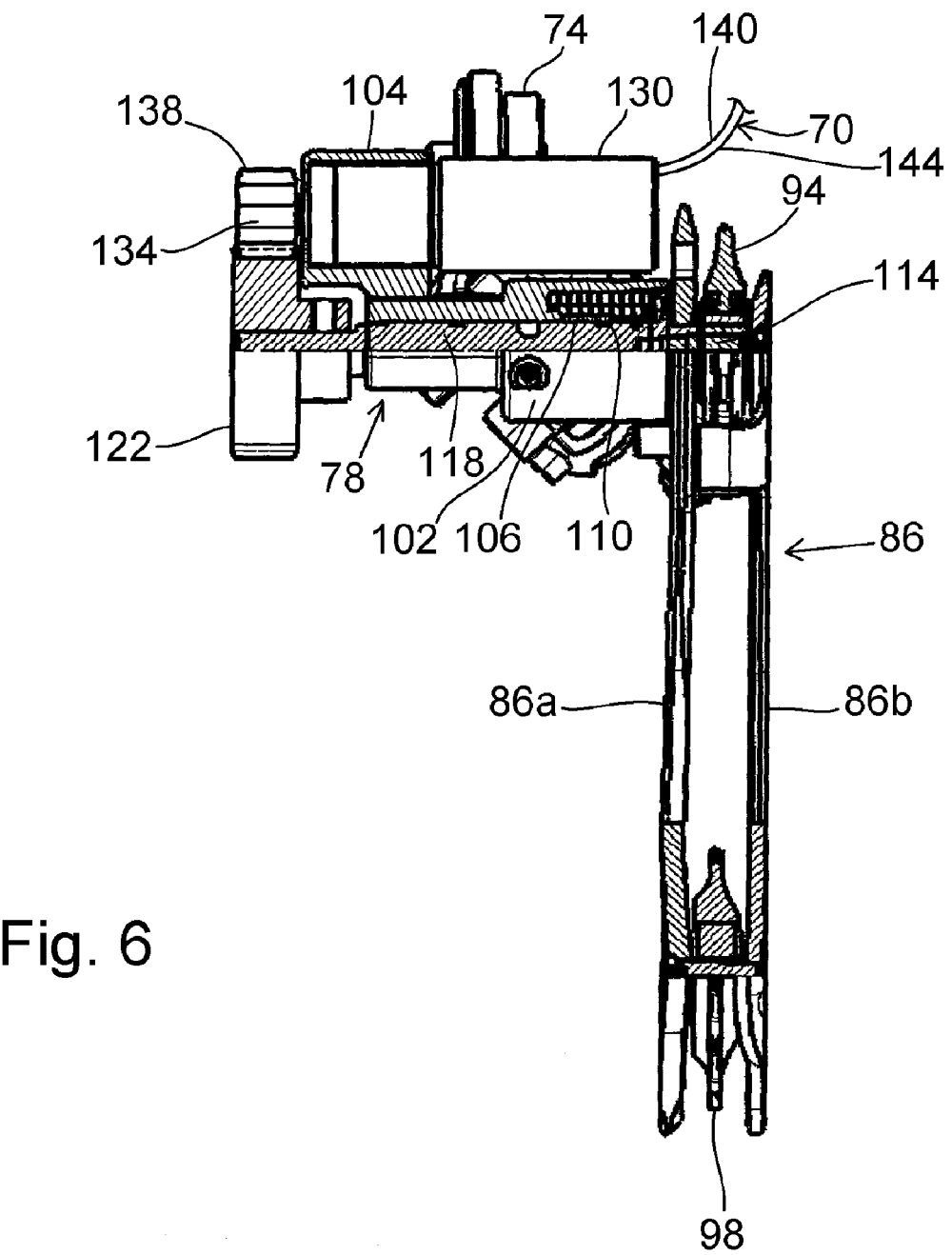
FIG. 6 is a partial cross-sectional front view of the rear derailleur.

FIG. 5 is a side view of a particular embodiment of rear derailleur 18, and FIG. 6 is a partial cross-sectional front view of rear derailleur 18. Rear derailleur 18 comprises a base member 74 for coupling to the rear end of chain stay 2c of frame 2, a movable member 78 coupled for movement relative to base member 74 through a linkage mechanism 82, and a chain guide 86 coupled to movable member 78 for guiding chain 23 among the plurality of sprockets in rear sprocket assembly 19b in response to movement of movable member 78. Linkage mechanism 82 comprises an outer link 82a and an inner link 82b, wherein outer link 82a and inner link 82b each have a first end pivotably coupled to base member 74 and a second end pivotably coupled to movable member 78. A return spring 90 is coupled between base member 74 and movable member 78 in a conventional manner to bias chain guide 86 laterally outwardly. Chain guide 86 comprises a pair of support plates 86a and 86b that rotatably support an upper guide pulley 94 and a lower tension pulley 98.

As shown in FIG. 6, movable member 78 includes a cylindrical first mounting boss 102 and a cylindrical second mounting boss 104. A chain guide mounting bolt 114 rotatably supports guide pulley 94 and fastens support plates 86a and 86b to a pivot shaft 118 that is pivotably supported by first mounting boss 102. In this embodiment, pivot shaft 118 extends through first mounting boss 102, and a chain guide control gear 122 is fixed to the outer end of pivot shaft 118 so that pivot shaft 118 and chain guide control gear 122 rotate as a unit.

First mounting boss 102 includes a blind bore 106 for supporting a biasing device in the form of a torsion spring 110. One end of spring 110 is mounted to first mounting boss 102, and the other end of spring 110 is mounted to support plate 86a. Spring 110 provides a clockwise biasing force to chain guide 86 (as viewed in FIG. 5) for tensioning chain 23 in a conventional manner.

A motor clutch 130 is mounted to second mounting boss 104. Motor clutch 130 includes an output shaft 134, and a clutch control gear 138 is mounted to output shaft 134 so that output shaft 134 and clutch control gear 138 rotate as a unit. Clutch control gear 138 engages chain guide control gear 122. Motor clutch 130 is coupled to communication path 70 for receiving signals from upshift resist control push button switch 62 and downshift resist control push button switch 66. In this embodiment, motor clutch 130, clutch control gear 138 and chain guide control gear 122 constitute movement resisting device 46 shown in FIG. 2 that resists movement of chain guide 86 to help maintain chain tension.

Motor clutch 130 is a normally-engaged (resistive or locked) clutch that resists or prevents rotation of clutch control gear 122 (and hence chain guide control gear 122 and chain guide 86), unless appropriate signals are provided from upshift resist control push button switch 62 or downshift resist control push button switch 66. In other words, the angular position of chain guide 86 is normally maintained. However, when the rider pushes either upshift push button 56 or downshift lever 58, the rider will simultaneously push the corresponding upshift resist control push button switch 62 or downshift resist control push button switch 66. The signal provided by upshift resist control push button switch 62 or downshift resist control push button switch 66 sets motor clutch 130 to the disengaged state so that clutch control gear 138, chain guide control gear 122, pivot shaft 118 and chain guide 86 rotate freely. This allows chain guide 86 to rotate quickly to set the proper tension of chain 23 for the destination gear without undesired resistance and decreased speed caused by prior art clutch and shock absorbing mechanisms. When the rider removes his or her thumb from upshift push button 56 or downshift lever 58, the corresponding upshift resist control push button switch 62 or downshift resist control push button switch 66 provides a signal that resets motor clutch 130 to the engaged state. As a result, chain guide 86 rotates freely while the gear shift operation takes place, but thereafter chain guide 86 is inhibited from rotating in both the clockwise and counterclockwise directions, and proper tension on chain 23 is maintained under even the harshest riding conditions.

In this embodiment, motor clutch 130 is an electrically-operated DC motor with two control elements in the form of input (control) terminals 140 and 144. The motor clutch 130 operates such that, when input terminals 140 and 144 are open, motor shaft 134 rotates relatively freely. However, when input terminals 140 and 144 are shorted, a pronounced resistance on motor shaft 130 is produced from the magnetic fields in the DC motor. Thus, when combined with a normally-closed upshift resist control push button switch 62 and a normally-closed downshift resist control push button switch 66, connected in series between input terminals 140 and 144, input terminals 140 and 144 of motor clutch 130 are normally shorted to a first operating condition (i.e., input terminals 140 and 144 receive a zero resistance or a resistance sufficiently small to create operable resistance at motor shaft 134), and motor clutch 130 is in a normally-engaged resistive state that resists rotation of clutch control gear 122 (and hence chain guide control gear 122 and chain guide 86). When either upshift resist control push button switch 62 or downshift resist control push button switch 66 is pressed, then continuity is broken (i.e., input terminals 140 and 144 receive an infinite resistance or a resistance sufficiently large to create operable free rotation of motor shaft 134) so that input terminals 140 and 144 of motor clutch 130 are in an open second operating condition, and clutch control gear 138, chain guide control gear 122, pivot shaft 118 and chain guide 86 rotate freely.

While the above is a description of various embodiments of inventive features, further modifications may be employed without departing from the spirit and scope of the present invention. For example, while motor clutch 130 resisted both clockwise and counterclockwise rotation of chain guide 86, a one-way clutch could be used. Also, motor clutch 130 could be replaced by an electrically operated magneto rheological shock absorber, an electromagnetic clutch, or some other electromagnetically operated resistance device. In some applications, communication path 70 could comprise optical fibers. Thus, the term "electrically-operated" as used herein can be applied to devices that operate primarily by electric signals (including, of course, a resistance signal), primarily by magnetic signals, by light signals converted into electrical impulses, and equivalent signals. While rotation of chain guide 86 was resisted, the movement resisting device could resist or prevent other chain relaxing movement whether or not such movement includes movement of chain guide 86 to guide chain 23 among the plurality of sprockets. While upshift resist control push button switch 62 or downshift resist control push button switch 66 were respectively mounted directly to upshift push button 56 or downshift lever 58, the resist control device could be mounted elsewhere. For example, the resist control device could be mounted internally to be a part of shift control switches such as those disclosed in U.S. Pat. No. 6,216,078 or 6,698,567. The resist control device could be activated by control cable 23, components within housing 54, or components at derailleur 18. While separate resist control switches were disclosed, such switches could be integrated into a single switch. Also, the motor body itself or some other structural component of the motor can be deemed an input. Such is often the case when the motor housing has the ability to function as a circuit ground when the motor is attached to the bicycle frame. The electrical signal inputs could be replaced by mechanical signal inputs. Also, the value of the input signal certainly is not limited to an open or closed resistance signal. The signal may have whatever value results in the appropriate change of resistance to the movement of chain guide 86.

The size, shape, location or orientation of the various components may be changed as desired. Components that are shown directly connected or contacting each other may have intermediate structures disposed between them. Separate components may be combined, and vice versa. The functions of one element may be performed by two, and vice versa. The function of one element may be performed by another, and functions may be interchanged among the elements. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Terms of degree such as "substantially," "about" and "approximately" as used herein include a reasonable amount of deviation of the modified term such that the end result is not significantly changed. For example, such terms may include a deviation of at least ±5% of the modified term as long as such a deviation would not negate the meaning of the word it modifies. Thus, the scope of the invention should not be limited by the specific structures disclosed or the apparent initial focus or emphasis on a particular structure or feature.

What is claimed is:

1. A bicycle derailleur apparatus comprising:
   a base member for coupling to a bicycle frame;
   a movable member coupled for movement relative to the base member;
   a chain guide coupled to the movable member for guiding a chain among a plurality of sprockets in response to movement of the movable member;
   a biasing device that provides a biasing force to the chain guide for tensioning the chain; and
   a movement resisting device with a control element for the application of a signal that causes the movement resisting device to change resistance to movement of the chain guide by changing resistance other than resistance provided by the biasing device:
   wherein the control element selectively activates and deactivates the movement resisting device independently of movement of the chain guide.

2. The apparatus according to claim 1 wherein the movement resisting device includes a movement preventing device that prevents movement of the chain guide other than movement of the chain guide to guide the chain among the plurality of sprockets.

3. The apparatus according to claim 1 further comprising a resist control device that controls the operation of the movement resisting device.

4. The apparatus according to claim 3 wherein the resist control device comprises a switch.

5. The apparatus according to claim 1 wherein the chain guide is rotatably coupled to the movable member, wherein the biasing device biases the chain guide to rotate in a first rotational direction, and wherein the movement resisting device resists rotation of the chain guide in a second rotational direction opposite the first rotational direction.

6. The apparatus according to claim 5 wherein the movement resisting device resists rotation of the chain guide in the first rotational direction and in the second rotational direction.

7. The apparatus according to claim 1 wherein the movement resisting device changes resistance to movement of the chain guide solely by changing resistance other than resistance provided by the biasing device.

8. The apparatus according to claim 1 wherein the movement resisting device is an electrically-operated movement resisting device.

9. A bicycle derailleur apparatus comprising:
   a base member for coupling to a bicycle frame;
   a movable member coupled for movement relative to the base member;
   a chain guide coupled to the movable member for guiding a chain among a plurality of sprockets in response to movement of the movable member;
   a biasing device that provides a biasing force to the chain guide for tensioning the chain;
   an electrically-operated movement resisting device with a control element for the application of an electrical signal that causes the movement resisting device to change resistance to movement of the chain guide;
   a resist control device that controls the operation of the movement resisting device; and
   a shift control device that is used to control movement of the chain guide among the plurality of sprockets, wherein the resist control device is mounted in close proximity to the shift control device.

10. The apparatus according to claim 9 wherein the resist control device is coupled to the shift control device.

11. The apparatus according to claim 10 wherein the shift control device includes an operating element, and wherein the resist control device is coupled to the operating element.

12. The apparatus according to claim 11 wherein the resist control device moves during operation of the operating element.

13. The apparatus according to claim 12 wherein the resist control device operates the movement resisting device during operation of the operating element.

14. The apparatus according to claim 13 wherein the resist control device moves together with the operating element during operation of the operating element.

15. The apparatus according to claim 14 wherein the resist control device comprises a switch that is operated during the operation of the operating element.

16. The apparatus according to claim 15 wherein the switch is mounted to a manually operated portion of the operating element.

17. The apparatus according to claim 16 wherein the switch is mounted to a surface of the operating element that is manually pressed to operate the operating element.

18. The apparatus according to claim 17 wherein the switch comprises a push button.

19. The apparatus according to claim 17 wherein the operating element comprises a lever.

20. The apparatus according to claim 17 wherein the operating element comprises a push button.

21. A bicycle derailleur apparatus comprising:
a base member for coupling to a bicycle frame;
a movable member coupled for movement relative to the base member;
a chain guide rotatably coupled to the movable member for guiding a chain among a plurality of sprockets in response to movement of the movable member;
a biasing device that provides a biasing force to the chain guide for tensioning the chain, wherein the biasing device biases the chain guide to rotate in a first rotational direction;
an electrically-operated movement resisting device with a control element for the application of an electrical signal that causes the movement resisting device to change resistance to movement of the chain guide;
wherein the movement resisting device resists rotation of the chain guide in the first rotational direction and in a second rotational direction opposite the first rotational direction;
a resist control device that controls the operation of the movement resisting device; and
a shift control device including a manually operated operating element that is used to control the movement of the chain guide among the plurality of sprockets,
wherein the resist control device comprises a switch mounted to a surface of the operating element that is pressed to operate the operating element.

22. The apparatus according to claim 21 wherein the switch comprises a push button.

* * * * *